United States Patent Office 2,743,343
Patented Apr. 24, 1956

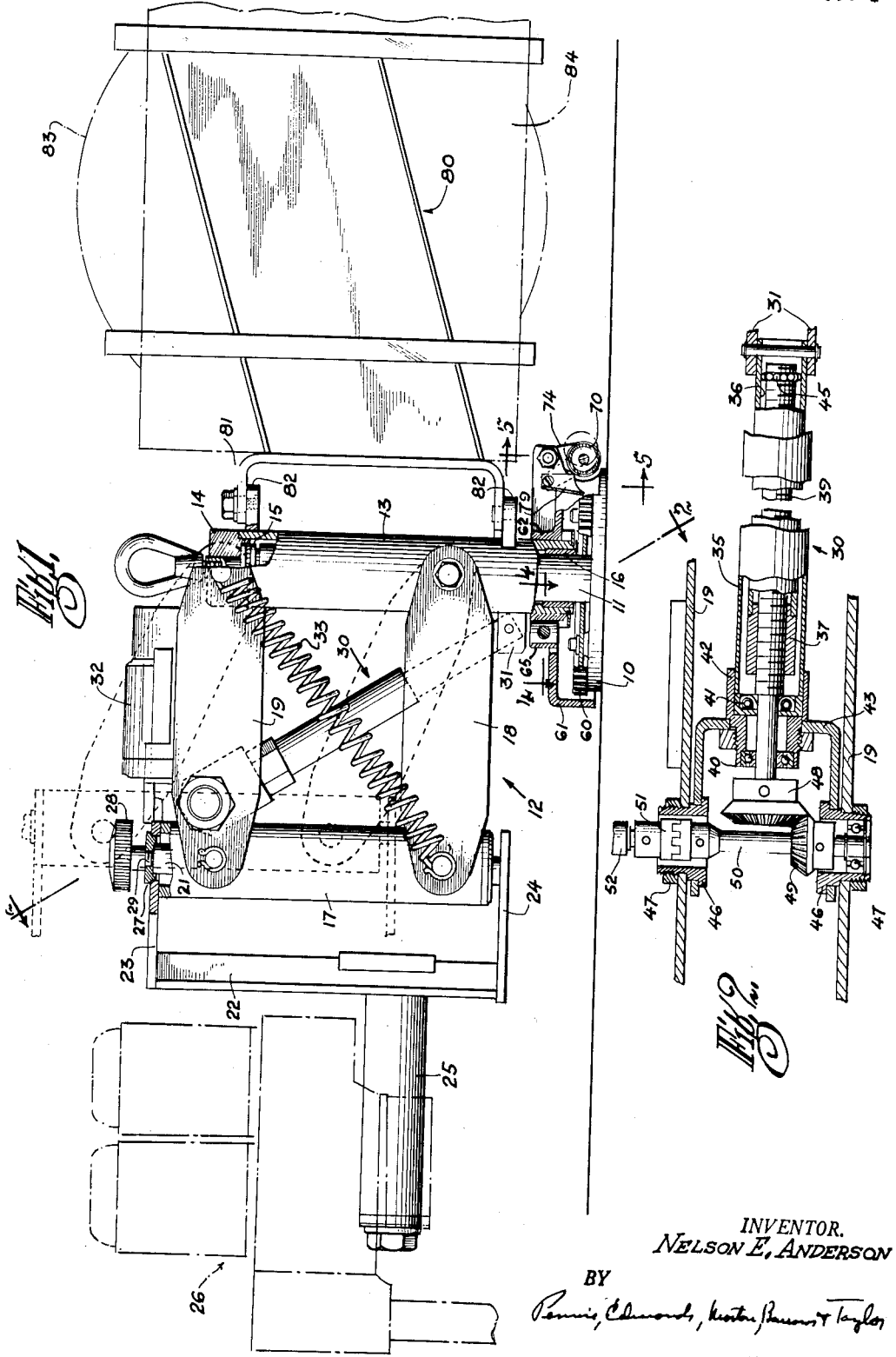

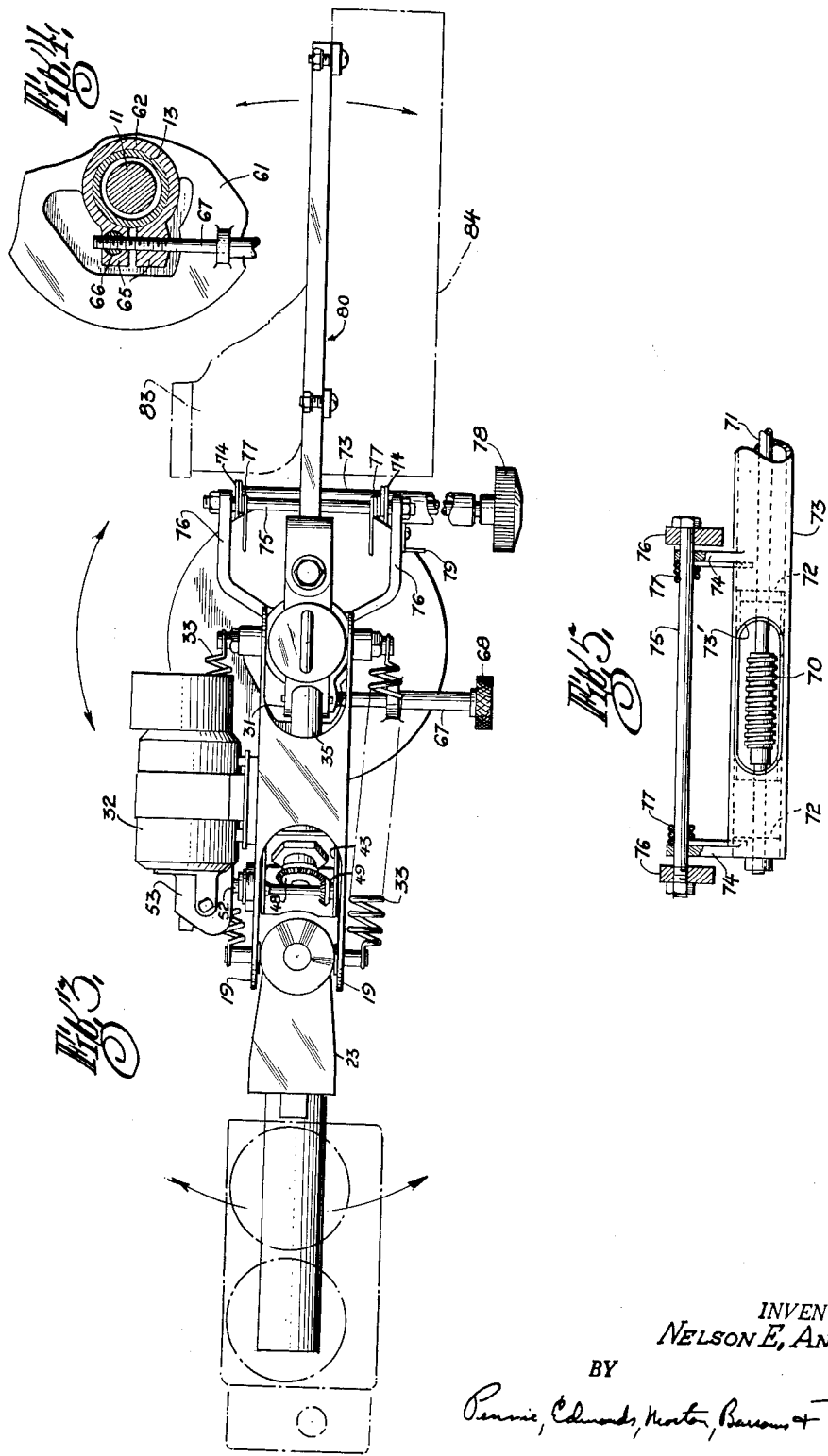

2,743,343

WELDING HEAD POSITIONER

Nelson E. Anderson, Berkeley Heights, N. J., assignor to Air Reduction Company, Incorporated, New York, N. Y., a corporation of New York Application July 28, 1953, Serial No. 370,776

12 Claims. (Cl. 219—8)

This invention relates to apparatus for suporting a welding head and allied apparatus for movement to a variety of positions for carrying out a welding operation. More specifically the invention is concerned with apparatus for supporting a gas shielded metal arc welding head, a supply of consumable electrode wire therefor, an electrical control panel, and the various allied equipment necessary for a substantially complete welding operation, the supporting apparatus being one by means of which the supported elements may be moved to a variety of positions and by which the welding head particularly may be moved vertically.

Broadly the supporting apparatus of my invention comprises a vertically disposed pivot post fixedly supported on a fixed or movable mounting. A folding parallelogram structure is vertically disposed with one vertical member being supported on said pivot post for rotation about the axis thereof. Upon the other vertically disposed member of the folding parallelogram structure, I provide a bracket for supporting a substantially horizontal welding head supporting post. The bracket is advantageously mounted on the vertically disposed member of the parallelogram structure for rotation or at least limited rotation about the axis thereof. A supporting framework for allied apparatus such as the aforementioned supply of consumable electrode wire and the electrical control panel is mounted on a bracket which is also mounted on the fixed vertical pivot post for rotation substantially about the axis thereof. Means to effect folding of the parallelogram structure to raise and lower the welding head supporting vertical member thereof is incorporated in the apparatus along with a motor means for operation thereof. Adjacent the lower ends of the fixed pivot post and the vertical member of the folding parallelogram structure supported thereby is provided means to rotate the latter about the axis of the pivot post to a plurality of positions. This last-mentioned means also accomplishes, when operated, a rotation substantially about the axis of the pivot post of the supporting frame for allied apparatus.

More specifically an apparatus according to my invention includes a folding parallelogram structure in which the vertically disposed member which is supported for rotation upon a fixed pivot post is a hollow cylindrical member concentrically disposed with respect to said vertical pivot post, the upper end being supported from the upper end of the pivot post by a thrust bearing and the lower end being spaced from the lower end of the pivot post by a bushing interposed therebetween. A spur gear is fixedly supported to surround the lower end of the pivot post. Adjustably secured to the lower end of the hollow cylindrical member is a gear housing supporting a worm gear movable into and out of engagement with the spur gear whereby the hollow cylindrical member and the folding parallelogram structure, of which it forms a part, may be rotated without back lash about the pivot post. The apparatus may also advantageously include a telescopically extensible means for folding the parallelogram structure and motor means adjustably supported by the parallelogram structure itself for operation of said telescopically extensible means. Additionally the apparatus may advantageously include means for locking the bracket, to which is secured the welding head supporting post, in any of its various rotational positions with respect to the vertically movable upright member of the folding parallelogram structure.

Further specific and advantageous features of my invention will be clear from the following specific description of one embodiment thereof taken in connection with the accompanying drawings in which:

Fig. 1 is an elevation partly in section of a welding head positioner according to my invention showing in outline the apparatus adapted to be supported thereby;

Fig. 2 is a sectional view taken along line 2—2 of Fig. 1 showing more clearly the means for folding the parallelogram structure and the driving connections therefor;

Fig. 3 is a plan view of the apparatus shown in Fig. 1;

Fig. 4 is a partial sectional view taken along line 4—4 of Fig. 1 to illustrate more clearly the means for securing the gear housing to the lower end of one vertical member of the folding parallelogram structure; and Fig. 5 is a sectional view taken along line 5—5 of Fig. 1 illustrating the manner in which the worm gear is mounted on the gear housing.

Referring first to Fig. 1, a fixed support plate 10 is provided which may be fixedly secured either to a movable or immovable supporting base structure. A pivot post 11 is vertically disposed on and fixed to support plate 10. A folding parallelogram structure indicated generally at 12, having a hollow cylindrical vertical member 13, is mounted on pivot post 11 by being concentrically disposed thereon with a shoulder 14 within the upper end thereof riding on a thrust bearing 15 mounted on the upper end of pivot post 11. A bushing 16 is interposed between the inner wall of cylindrical member 13 and the lower end of the pivot post to maintain proper spacing of the lower end of the former from the pivot post.

The folding parallelogram structure 12 includes, in addition to hollow cylindrical member 13, a second vertically disposed hollow cylindrical member 17 and pairs of connecting bars or plates 18 and 19 which are pivotally connected at opposite ends to members 13 and 17. Suitably supported within member 17 is a pivot rod or post 21 about which a bracket 22 having arms 23 and 24 may be pivoted, the arms 23 and 24 having openings through which rod or post 21 may extend. A substantially horizontally disposed pivot post 25 is fixedly secured to bracket 22 and is adapted to support a welding head assembly 26 shown in outline in Figs. 1 and 3. The welding head assembly is adapted to be adjustably clamped to pivot post 25 for rotational positioning thereabout. A locking plate 27 is supported on the upper surface of arm 23 of bracket 22. A locking knob 28 is threadedly received on a threaded extension 29 of pivot rod or post 21 and is adapted, when threaded onto said extension, to urge said locking plate 27 tightly into engagement with arm 23 of bracket 22, forcing it against cylindrical member 17 to prevent rotation of bracket 22 about pivot post or rod 21 whereby the bracket and its supported welding head assembly may be fixed in any adjusted position therefor with respect to the folding parallelogram structure 12.

In order to fold the folding parallelogram structure 12 a conventional jack screw, indicated generally at 30, is provided having its lower end pivotally secured to a bracket 31 which is in turn secured to cylindrical member 13 of the folding parallelogram structure. The upper end of the jack screw is pivotally supported by and secured between members 19 of the folding parallelogram structure. A motor 32 for operation of the jack screw in a manner to be hereinafter described is supported by one of the members 19 of the parallelogram structure.

By means of the jack screw 30 and motor 32 the parallelogram structure may be folded to move outer cylindrical member 17 in a vertical plane. Such movement is illustrated in Fig. 1 where two positions of members 17, 18 and 19 of the folding parallelogram structure 12 are shown, one in solid and one in dotted lines. To aid in the support of the parallelogram structure and the welding head assembly supported thereby so that the load on motor 32 may be minimized, I provide a pair of counterbalancing springs 33, one on either side of the parallelogram structure, the opposite ends of the springs being secured as shown to the inner pivot support of connecting plates 19 and to the outer pivot support of connecting plates 18.

By reference to Figs. 2 and 3, it may be seen that the jack screw 30 comprises a pair of telescoping tubular members 35 and 36, the latter extending within the former and carrying on its inner end a plug 37 having a threaded opening therein to receive a threaded operating shaft 39. The operating shaft 39 is rotatably supported against substantial longitudinal movement in a pair of bearings 40 and 41 mounted in a connecting member 42 by which the tubular member 35 of the jack screw and the threaded shaft 39 are supported from a double yoke bracket 43. At its lower end threaded shaft 39 carries bearings 45 to maintain it spaced from and freely movable relative to the inner wall of tubular member 36. The double yoke member 43 is pivotally secured to connecting members 19 by a pair of bearing members 46 received in openings in connecting members 19 and secured therein by nuts 47. A bevel gear 48 is fixedly secured to the upper end of threaded shaft 39 in driving engagement with a somewhat similar bevel gear 49 mounted on a drive shaft 50 journaled in bearing members 46. Drive shaft 50 is connected by a coupling 51 to the output shaft 52 of gear box 53 of motor 32. By such apparatus, as previously indicated, the folding parallelogram structure 12 may be raised or lowered to raise or lower welding head assembly 26.

In order to rotate the folding parallelogram structure 12 about main pivot post 11, I provide a spur gear 60 (Fig. 1) fixedly secured to base plate 10 and surrounding the lower end of the pivot post. A gear housing 61 having a clamp portion 62 fixedly secured thereto is mounted on the lower end of and surrounding the hollow cylindrical member 13 of the folding parallelogram structure. The clamp portion 62 of housing 61 is perhaps most clearly illustrated in Fig. 4. It includes two wing sections 65 in one of which, if the clamp portion is made of a soft metal, there may be inserted a steel insert 66 to receive a threaded shaft 67 whereby the clamp may be tightened about cylindrical member 13 to fixedly secure the gear housing 61 thereto. Threaded shaft 67 may be turned by means of a knurled knob 68 (Fig. 3).

A worm gear 70 (Figs. 1 and 5) is supported on a drive shaft 71 mounted in bearings 72 within a protective cylindrical casing 73 which is supported by brackets 74 from a pivot supporting rod 75 mounted in projecting portions 76 of gear housing 61. Protective casing 73, and hence worm gear 70, are adapted to be pivoted about supporting rod 75 for movement of the worm gear 70 into and out of engagement with spur gear 60, an opening 73' in casing 73 being provided to accommodate the engagement. Springs 77 (Figs. 3 and 5) normally urge worm gear 70 into contact with the spur gear 60. A locking member 79 (Fig. 1) is pivotally secured to gear housing 61 and is adapted, when moved to its dotted line position as illustrated, to engage worm housing 73 to maintain it and worm gear 70 out of engagement with spur gear 60. When worm gear 70 is not thus maintained out of engagement with spur gear 60, however, the folding parallelogram structure is movable about pivot post 11 only by rotation of the worm gear. Such rotation of the worm gear may be effected through its support shaft 71 to the outer end of which is secured an operating knob 78. Such adjusting means permits rotation of the folding parallelogram structure and the supported apparatus to an infinite number of positions about pivot post 11.

To those skilled in the art of gear drives the enagement of a worm gear with a spur gear rather than with a worm wheel may appear, as indeed it is, a somewhat inefficient driving arrangement. However, in a worm-worm wheel arrangement, there is always some back lash whereas in the worm-spur arrangement there is substantially none. The fact that the latter is an inefficient arrangement from the point of view of wear is unimportant because of the limited use of the rotating mechanism.

A supporting frame 80 for apparatus that may be necessary for full operation of welding head 26 is supported by a bracket 81 which is in turn pivotally supported on projections 82 welded or otherwise secured to hollow cylindrical member 13. If welding head 26 is a gas shielded metal arc welding head, the apparatus that may be supported on frame 80 may advantageously comprise an encased supply of consumable electrode wire indicated in phantom at 83, and an electrical control panel 84 likewise outlined in phantom.

As will be apparent to those skilled in the art, various changes and modifications may be made in the embodiment of my invention illustrated in the accompanying drawings and specifically described above without departing from the scope of my invention. Hence my invention should be limited only to the extent set forth in the appended claims.

I claim:

1. Apparatus for supporting a welding head and associated apparatus comprising a fixed vertical pivot post, a vertically disposed folding parallelogram structure one vertical member of which is supported on said pivot post for rotation about the axis of said pivot post, a bracket supported on said pivot post for rotation substantially about the axis thereof and adapted to support apparatus associated with said welding head, a welding head mounting post rotatably supported on the other vertical member of said parallelogram structure for rotation about the axis of said other vertical member, said mounting post being substantially horizontally disposed and adapted to support a welding head for rotation thereabout, means to fold said parallelogram structure to raise and lower said other vertical member thereof, motor means to operate said folding means, and means adjacent the lower end of said rotatably supported one vertical member of said parallelogram structure to rotate it and said parallelogram structure about said vertically disposed pivot post to a plurality of positions.

2. Apparatus for supporting a welding head and associated apparatus comprising a fixed vertical pivot post, a vertically disposed folding parallelogram structure one vertical member of which is supported on said pivot post for rotation about the axis of said pivot post, a bracket supported on said pivot post for rotation substantially about the axis thereof and adapted to support apparatus associated with said welding head, a welding head mounting post rotatably supported on the other vertical member of said parallelogram structure for rotation about the axis of said other vertical member, said mounting post being substantially horizontally disposed and adapted to support a welding head for rotation thereabout, means to fold said parallelogram structure to raise and lower said other vertical member thereof, motor means to operate said folding means, a fixed spur gear surrounding the base of said vertically disposed pivot post, a gear housing secured to the base of said one vertical member of the parallelogram structure, a worm gear supported by said housing for engagement with said spur gear, and means for turning said worm gear in engagement with said spur gear to rotate said housing and said parallelogram structure about the vertically disposed pivot post.

3. Apparatus according to claim 2 which includes means for supporting said worm gear from said housing for movement into and out of engagement with said spur gear, and means for locking said worm gear in position out of engagement with said spur gear.

4. Apparatus according to claim 3 which includes means normally urging said worm gear into engagement with said spur gear.

5. Apparatus for supporting a welding head and associated apparatus comprising a fixed vertical pivot post, a vertically disposed folding parallelogram structure one vertical member of which is supported on said pivot post for rotation about the axis of said pivot post, a bracket supported on said pivot post for rotation substantially about the axis thereof and adapted to support apparatus associated with said welding head, a welding head mounting post rotatably supported on the other vertical member of said parallelogram structure for rotation about the axis of said other vertical member, said mounting post being substantially horizontally disposed and adapted to support a welding head for rotation thereabout, a telescopically extensible jack screw for folding said parallelogram structure to raise and lower said other vertical member thereof, one end of said jack screw being secured to said one vertical member of said parallelogram structure and the other end of said jack screw being secured to a laterally extending member of said parallelogram structure adjacent the outer end thereof, and means adjacent the lower end of said rotatably supported one vertical member of said parallelogram structure to rotate it and said parallelogram structure about said vertically disposed pivot post to a plurality of positions.

6. Apparatus for supporting a welding head and associated apparatus comprising a fixed vertical pivot post, a vertically disposed folding parallelogram structure one vertical member of which is supported on said pivot post for rotation about the axis of said pivot post, a bracket supported on said pivot post for rotation substantially about the axis thereof and adapted to support apparatus associated with said welding head, a welding head mounting post rotatably supported on the other vertical member of said parallelogram structure for rotation about the axis of said other vertical member, said mounting post being substantially horizontally disposed and adapted to support a welding head for rotation thereabout, a telescopically extensible jack screw for folding said parallelogram structure to raise and lower said other vertical member thereof, one end of said jack screw being secured to said one vertical member of said parallelogram structure and the other end of said jack screw being secured to a laterally extending member of said parallelogram structure adjacent the outer end thereof, a fixed spur gear surrounding the base of said vertically disposed pivot post, a gear housing secured to the base of said one vertical member of the parallelogram structure, a worm gear supported by said housing for engagement with said spur gear, and means for turning said worm gear in engagement with said spur gear to rotate said housing and said parallelogram structure about the vertically disposed pivot post.

7. Apparatus according to claim 6 which includes means for supporting said worm gear from said housing for movement into and out of engagement with said spur gear, and means for locking said worm gear in position out of engagement with said spur gear.

8. Apparatus for supporting a welding head and associated apparatus comprising a fixed vertical pivot post, a vertically disposed folding parallelogram structure one vertical member of which is supported on said pivot post for rotation about the axis of said pivot post, a bracket supported on said pivot post for rotation substantially about the axis thereof and adapted to support apparatus associated with said welding head, said bracket being fixed with respect to said folding parallelogram structure relative to said pivot post, a welding head mounting post rotatably supported on the other vertical member of said parallelogram structure for rotation about the axis of said other vertical member, means for locking said mounting post in any rotated position relative to said other vertical member, said mounting post being substantially horizontally disposed and adapted to support a welding head for rotation thereabout, means to fold said parallelogram structure to raise and lower said other vertical member thereof, motor means to operate said folding means, and means adjacent the lower end of said rotatably supported one vertical member of said parallelogram structure to rotate it and said parallelogram structure about said vertically disposed pivot post to a plurality of positions.

9. Apparatus for supporting a welding head and associated apparatus comprising a fixed vertical pivot post, a vertically disposed folding parallelogram structure one vertical member of which is supported in said pivot post for rotation about the axis of said pivot post, a bracket supported on said pivot post for rotation substantially about the axis thereof and adapted to support apparatus associated with said welding head, a welding head mounting post rotatably supported on the other vertical member of said parallelogram structure for rotation about the axis of said other vertical member, said mounting post being substantially horizontally disposed and adapted to support a welding head for rotation thereabout, means to fold said parallelogram structure to raise and lower said other vertical member thereof, motor means to operate said folding means, at least one counterbalance spring secured at one end to the upper end of said one vertical member of the folding parallelogram and at its other end to the outer end of the lower laterally extending member of the folding parallelogram whereby the folding parallelogram structure is normally urged by said counterbalance spring toward its folded position in which said other vertical member is at its uppermost position, and means adjacent the lower end of said rotatably supported one vertical member of said parallelogram structure to rotate it and said parallelogram structure about said vertically disposed pivot post to a plurality of positions.

10. Apparatus for supporting a welding head and associated apparatus comprising a fixed vertical pivot post, a vertically disposed folding parallelogram structure, one vertical member of said folding parallelogram structure being a hollow cylindrical member mounted on and surrounding said vertically disposed pivot post, a thrust bearing interposed between the upper end of said pivot post and a shoulder within the upper end of said hollow cylindrical member, a bracket fixedly secured to said hollow cylindrical member and extending therefrom in a direction substantially opposite that in which the remainder of the folding parallelogram structure extends, said bracket being adapted to support apparatus associated with said welding head, a substantially horizontally extending welding head mounting post supported on the other vertical member of said parallelogram structure for rotation about the axis of said other vertical member, means to lock said welding head mounting post in any rotated position thereof, a telescopically extensible jack screw for folding said parallelogram structure, one end of said jack screw being secured to said hollow cylindrical member and the other end thereof being secured to a laterally extending member of the parallelogram structure, motor means supported by a laterally extending member of said parallelogram structure to operate said jack screw, counterbalancing springs normally urging said parallelogram structure towards its folded position in which said other vertical member is at its uppermost position, a spur gear fixed with respect to and surrounding the base of said vertically disposed pivot post, a gear housing fixedly secured to the lower end of said hollow cylindrical member of said folding parallelogram structure, a worm gear supported by said housing for movement into and out of engagement with said spur gear, means for holding said worm gear out of its position of engagement with said spur gear, means normally urging said worm gear into engagement with said spur gear, and means for turning said worm gear to rotate said housing and said parallelogram structure about said vertically disposed pivot post when said worm gear is in engagement with said spur gear.

11. A driving gear mechanism adapted for use in adjustment of a vertically disposed member of a folding parallelogram about a fixed vertical pivot post, which comprises a fixed spur gear surrounding the base of said vertically disposed pivot post, a gear housing secured to the base of said vertical member of the parallelogram structure, a worm gear supported by said housing for engagement with said spur gear, and means for turning said worm gear in engagement with said spur gear to rotate said housing and said parallelogram structure about the vertically disposed pivot post.

12. Apparatus according to claim 11 which includes means for supporting said worm gear from said housing for movement into and out of engagement with said spur gear, means normally urging said worm gear into engagement with said spur gear, and means for locking said worm gear in position out of engagement with said spur gear.

References Cited in the file of this patent
UNITED STATES PATENTS

| | | |
|---|---|---|
| 854,999 | Grauhering | May 28, 1907 |
| 1,562,967 | Johnson et al. | Nov. 24, 1925 |
| 1,638,938 | Koenigkramer | Aug. 16, 1927 |
| 1,809,653 | Wagner et al. | June 9, 1931 |
| 2,122,933 | Eckman | July 5, 1938 |
| 2,182,575 | Baird et al. | Dec. 5, 1939 |
| 2,189,399 | Lewbers | Feb. 6, 1940 |